April 27, 1954
C. E. KERR
2,676,634
BEAN SNIPPER
Filed Jan. 12, 1950
7 Sheets-Sheet 1
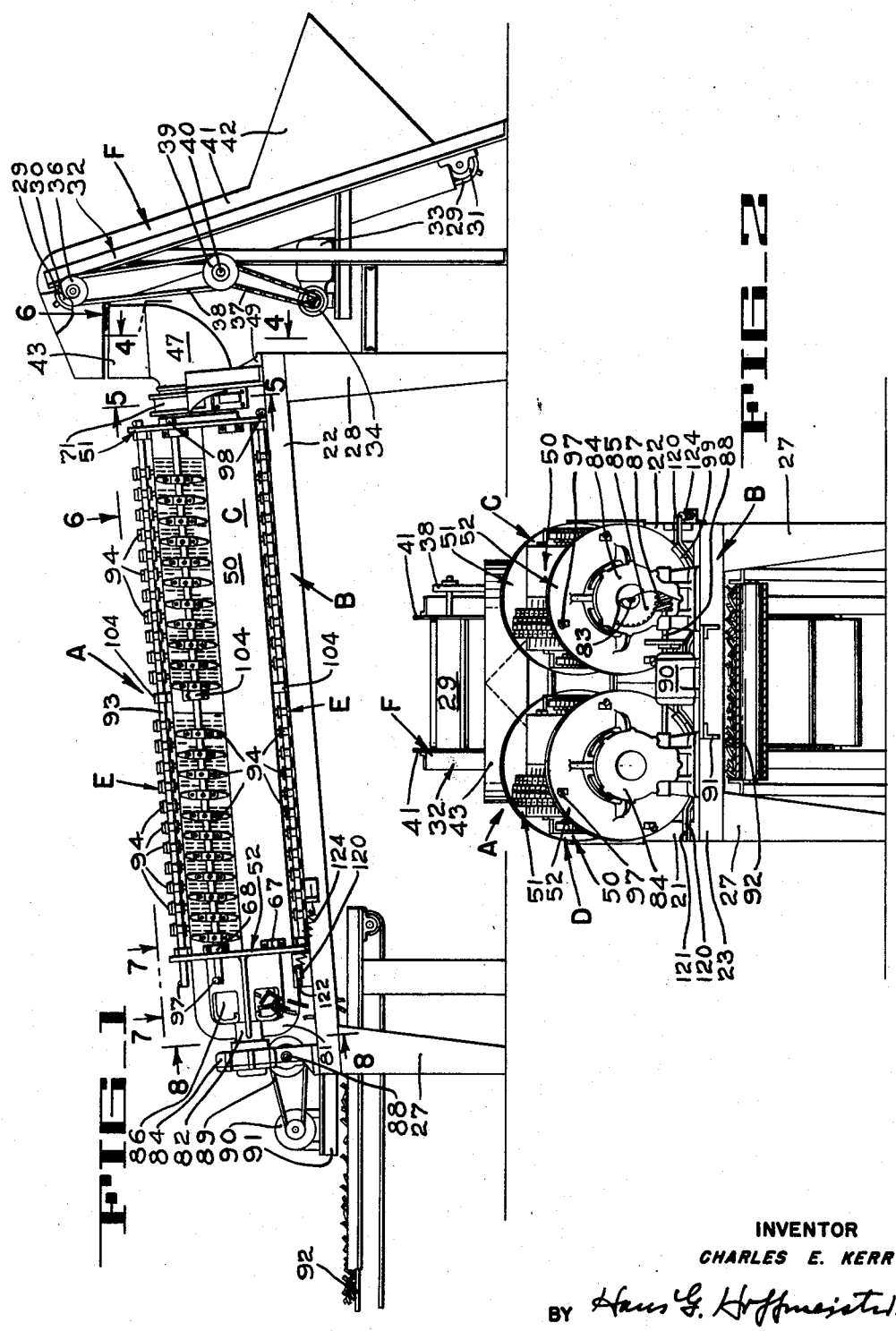
INVENTOR
CHARLES E. KERR
BY Hans G. Hoffmeister.
ATTORNEY

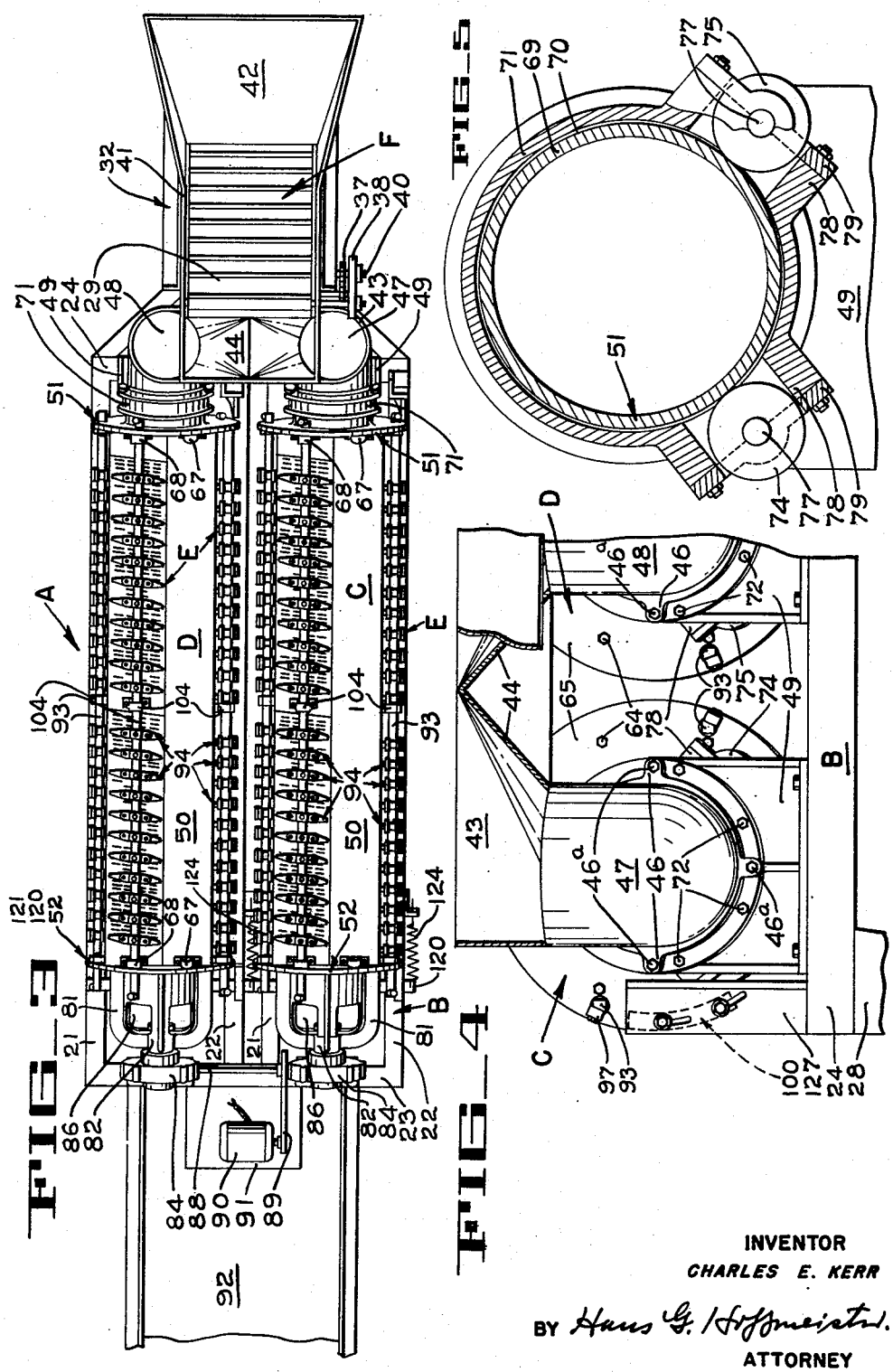
April 27, 1954 — C. E. KERR — 2,676,634
BEAN SNIPPER
Filed Jan. 12, 1950 — 7 Sheets-Sheet 2
INVENTOR
CHARLES E. KERR
BY Hans G. Hoffmeister
ATTORNEY

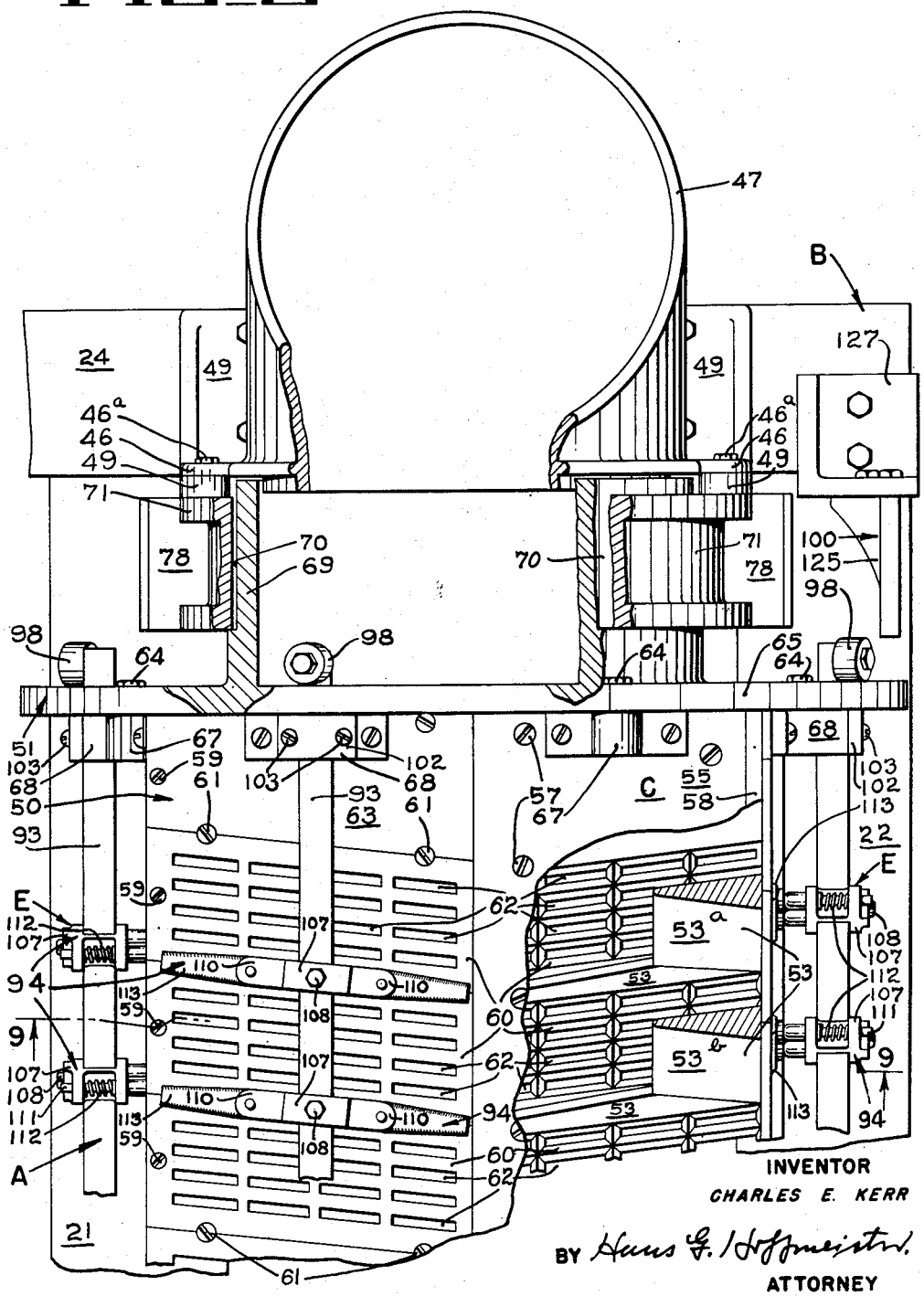

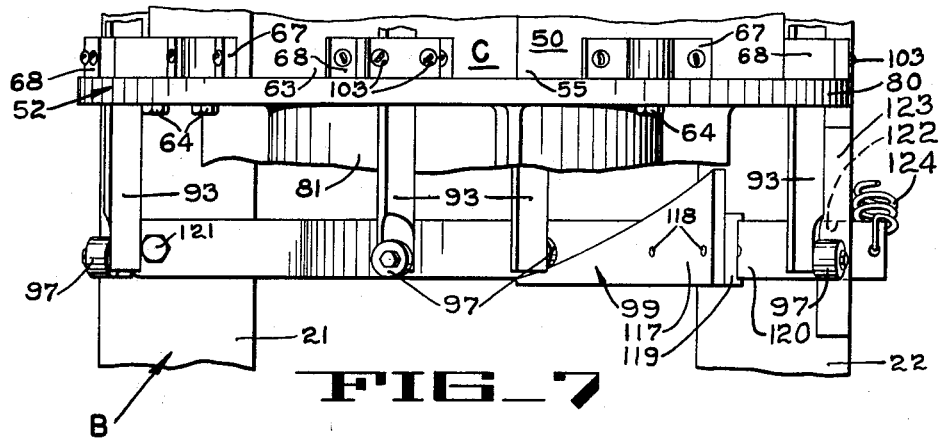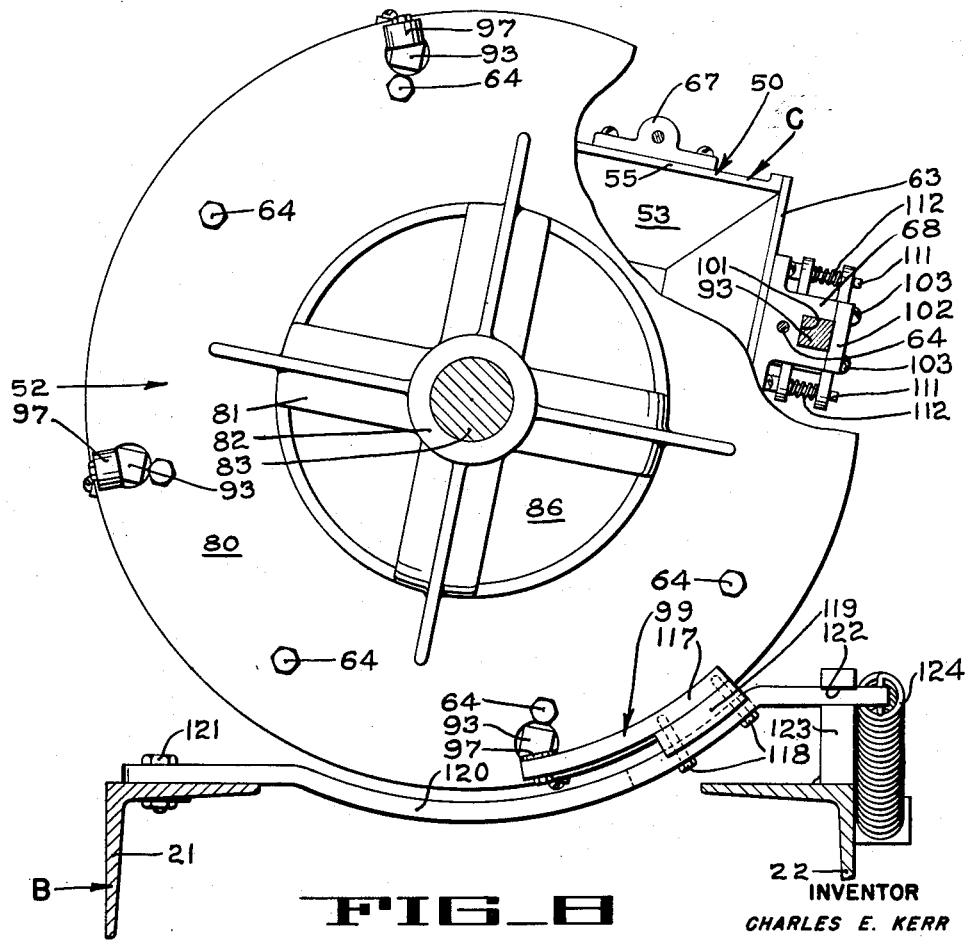

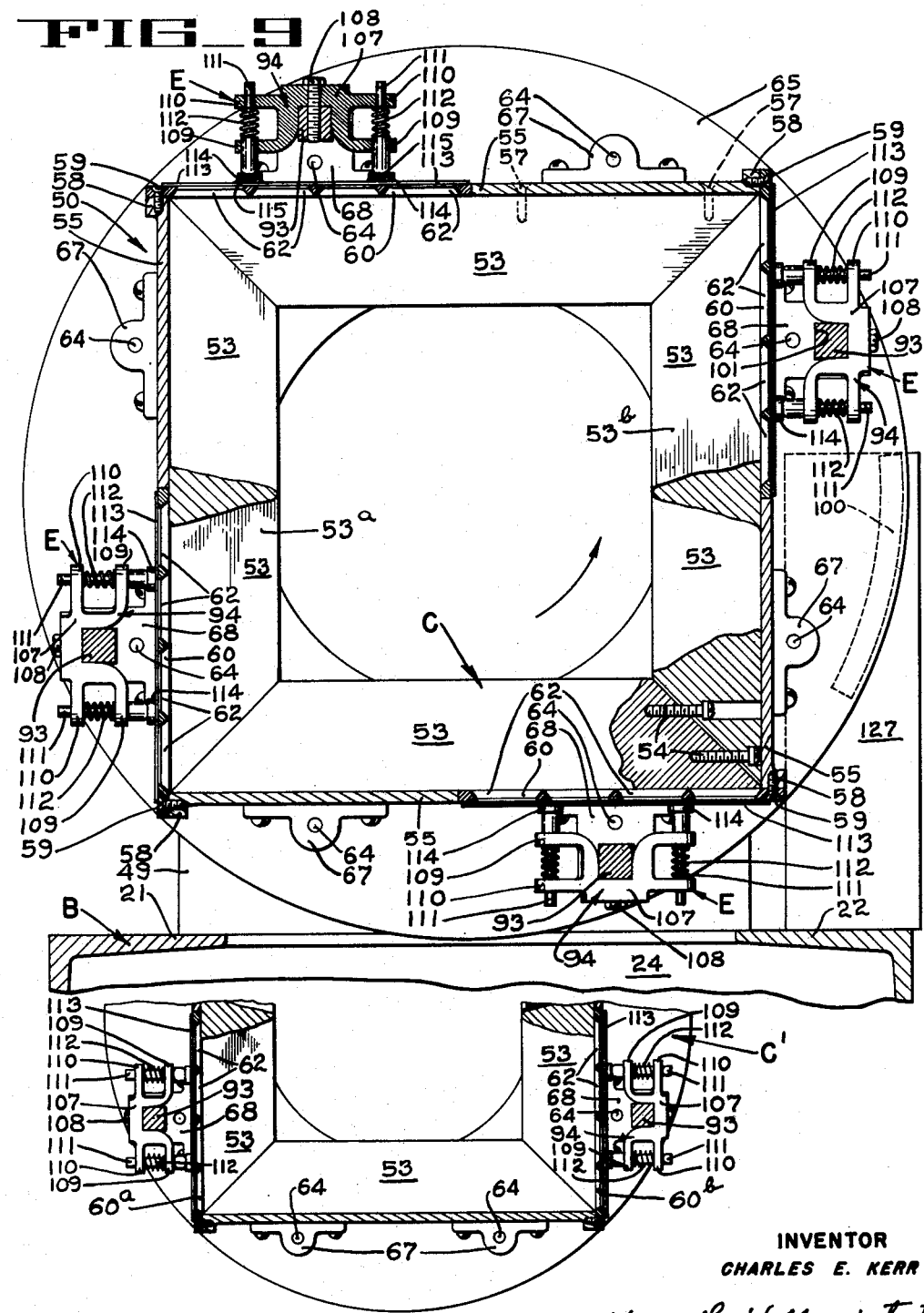

April 27, 1954 C. E. KERR 2,676,634
BEAN SNIPPER
Filed Jan. 12, 1950 7 Sheets-Sheet 6
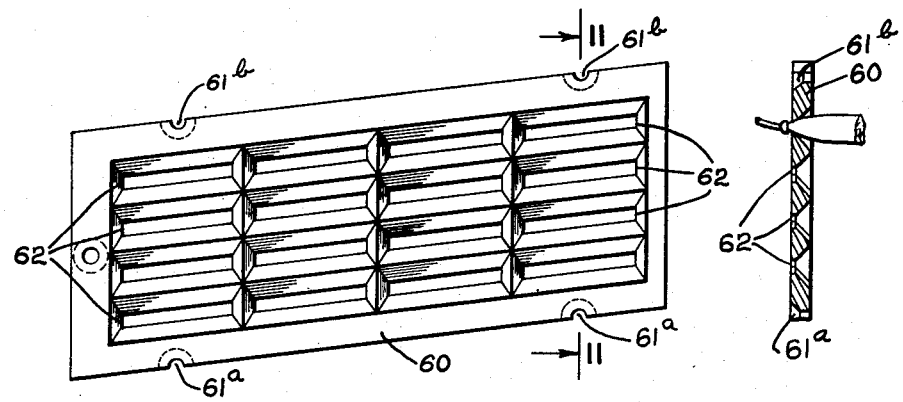
FIG_10  FIG_11
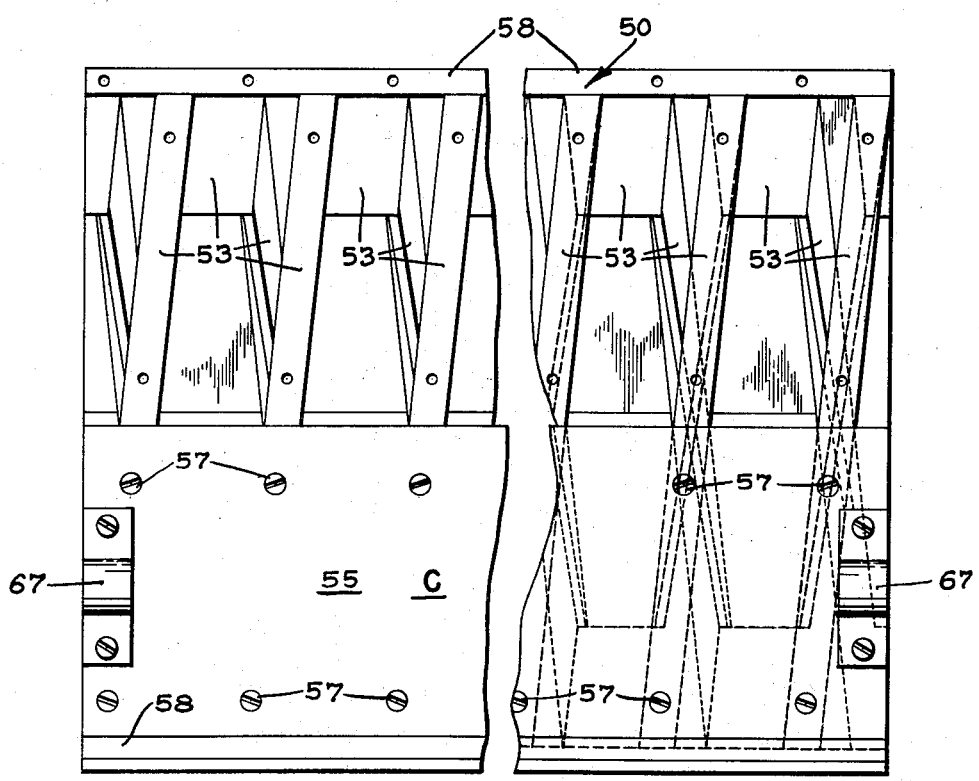
FIG_12
INVENTOR
CHARLES E. KERR
BY Hans G. Hoffmeister
ATTORNEY

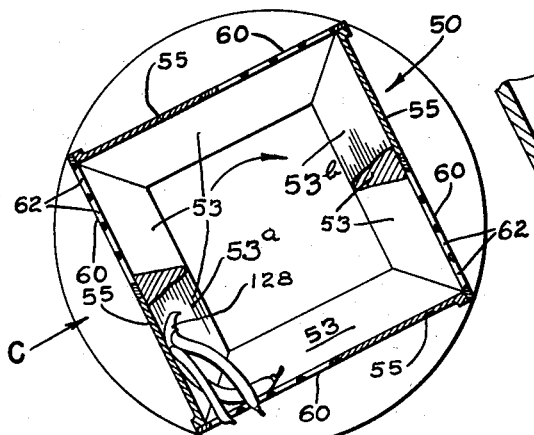
FIG_13
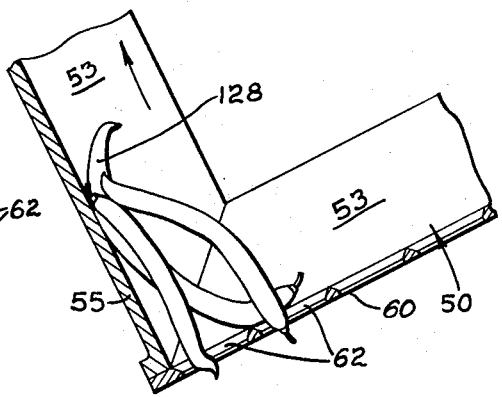
FIG_13A
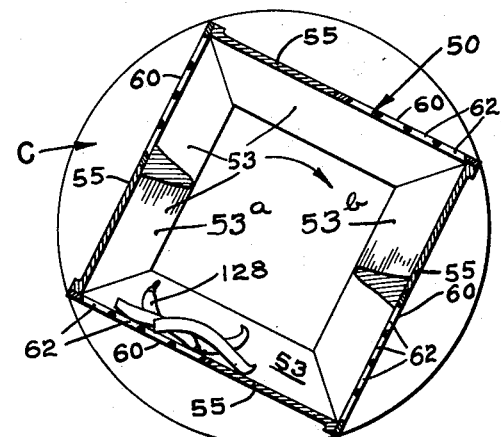
FIG_14
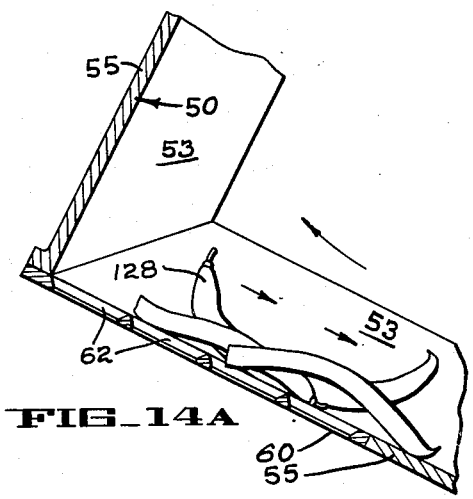
FIG_14A
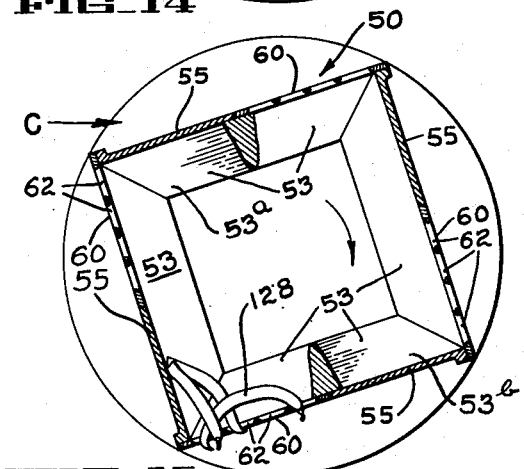
FIG_15
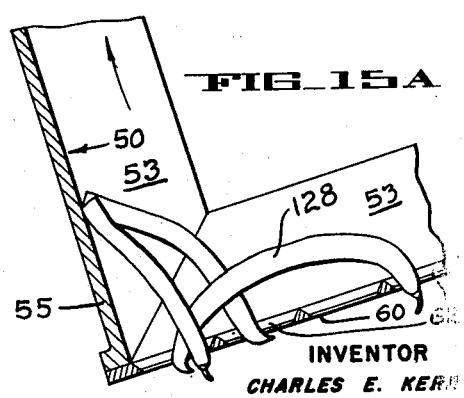
FIG_15A
INVENTOR
CHARLES E. KERR
BY
ATTORNEY Patented Apr. 27, 1954

2,676,634

UNITED STATES PATENT OFFICE 2,676,634

BEAN SNIPPER

Charles E. Kerr, Hoopeston, Ill., assignor to Food Machinery and Chemical Corporation, San Jose, Calif., a corporation of Delaware Application January 12, 1950, Serial No. 138,153

33 Claims. (Cl. 146—86)

1

The present invention relates to a bean snipper, and more particularly to a flat-sided drum type mechanism for feeding, positioning, and snipping the tips from string beans preparatory to packing.

An object of the present invention is to provide an improved drum type bean snipper.

Another object is to provide a bean snipper having a rotatable flat sided drum, with tip snipping means provided at the intersections of adjacent drum sides.

Another object is to provide a bean snipper having a flat sided drum, with guide means to cause beans in the drum to slide endwise along a drum side on operation thereof alternately to present opposite tip ends of the beans to tip snipping mechanisms located at the terminal ends of the drum side in the direction of slide.

Another object is to provide a flat sided bean snipping drum with a helical guiding conveyor adapted to guide the beans endwise along successive adjacent sides of the drum upon rotation thereof and to cause the beans to progress through the drum to a point of discharge.

Another object is to co-ordinate the action of means for producing a positively controlled guided sliding action on a bean which causes the tip end of the bean to project into an opening provided therefor, with the action of tip severing means, whereby the tip severing means is moved to sever the projecting bean tip, and thereafter automatically to reverse the direction of bean movement end for end and repeat the severing operation on its other tip.

Another object is to provide a bean snipper having a flat-sided rotary drum with guiding chutes formed along the inner walls of the drum, the angles of intersection between adjacent flat sides of the drum having perforated plates, the tip ends of beans in the drum being guided to extend into the perforations in the plates for snipping, and the perforated plates being disposed at an angle to tip the beans over endwise upon rotation of the drum and cause them to slide down a next successive guiding chute in end for end reversed condition.

Another object is to provide a relatively small, high speed mechanism for feeding and snipping the tip ends from beans wherein the beans are guided endwise toward a snipping mechanism, are snipped, and then are reversed end-for-end and guided endwise toward another snipping mechanism.

These and other objects and advantages of the invention will become apparent from the following description and the accompanying drawings, wherein:

Fig. 1 is a side elevation of a double drum bean snipper embodying the present invention, a feed elevator and a portion of a take-off conveyor being shown.

Fig. 2 is an end elevation of the discharge end of the mechanism shown in Fig. 1.

Fig. 3 is a plan view of the mechanism shown in Figs. 1 and 2.

Fig. 4 is an enlarged fragmentary section taken along the line 4—4 of Fig. 1.

Fig. 5 is an enlarged fragmentary section taken along the line 5—5 of Fig. 1.

Fig. 6 is an enlarged fragmentary section taken along the line 6—6 of Fig. 1, portions thereof being broken away.

Fig. 7 is an enlarged fragmentary plan view looking in the direction of the arrows 7—7 in Fig. 1.

Fig. 8 is a similarly enlarged fragmentary section taken along the line 8—8 of Fig. 1.

Fig. 9 is a fragmentary section taken along the line 9—9 of Fig. 6.

Fig. 10 is a detail elevation showing the inner side of a shear plate adapted to be mounted in rows along each side of the snipping drum.

Fig. 11 is a section taken along the line 11—11 of Fig. 10.

Fig. 12 is an enlarged fragmentary plan view of the two end portions of the rotary drum, the intermediate central portion being broken away, and the heads, shear plates and snipping blade assemblies being removed, the hidden conveyor flights being shown in dotted lines on the right hand half of the figure.

Figs. 13, 13A, 14, 14A, 15 and 15A show, respectively, a diagrammatic cross section of the rectangular snipping drum and an enlarged fragment thereof in different successive rotative positions of the drum, the snipping knives being omitted.

Fig. 16 (Sheet 5) is a fragmentary section, similar to the lower portion of Fig. 9, of a modified arrangement of snipping drum.

Figs. 1, 2 and 3 show in its entirety a two-drum bean snipper A embodying the present invention. The machine comprises a base frame B with angle iron longitudinal members 21 and 22, and transverse end members 23 and 24. Supporting legs 27 and 28 are provided on the opposite ends of the frame, the legs 27 on the discharge end of the machine being shorter than those on the intake end so as to tilt the entire structure toward the discharge end. A pair of snipping drums C and D are mounted for rotation on the supporting frame B thus formed, the axes of the two drums being parallel and inclined downwardly toward the discharge end of the machine. A plurality of snipping blade assemblies E are mounted on the drums to snip off the tips of beans or other elongated products which protrude through perforations in the drum wall.

A charging mechanism F for feeding the product into the drums is of a usual type and comprises a slatted elevator belt 29 (Figs. 1 and 3) trained around head and tail rollers 30 and 31, which are journaled on the upper and lower ends, respectively, of a generally upright elevator frame 32. The head roller 30, Fig. 1, is driven from an electric motor 33, through an adjustable speed reducer 34 of a usual type, by a drive chain 37 and V-belt 38, which passes around a pulley 39 mounted on a usual jack shaft 40 and a pulley 36 on the shaft of the head roller 30.

The elevator is enclosed in a usual sheet metal casing 41, and a charging hopper 42 is provided on the lower end of the casing wherein the string beans to be processed by the machine are dumped. The elevator discharges the beans elevated from the hopper 42 over the head roller 30 and thence into an intake casing 43 of oblong cross section.

An inverted V-shaped divider plate 44 (Figs. 3 and 4) is mounted in the casing 43. The downwardly sloping side portions of the divider plate 44 divide the stream of beans discharged thereon by the elevator substantially equally between two intake elbows 47 and 48 which are mounted on brackets 49 (Figs. 1, 3 and 6) bolted onto the transverse end frame member 24. Each of the intake elbows is provided with three radially extending ears 46 (Figs. 4 and 6) drilled to receive cap screws 46a by which the elbows are mounted on the brackets 49.

The two snipping drums C and D and their associated mounting and operating arrangements are substantially similar to each other, and one only thereof will be described in detail. Each drum comprises a hollow body portion 50, of generally polygonal cross sectional shape, with annular heads 51 and 52 secured over the ends thereof.

The walls of the body portion of the drum are of composite structure (Figs. 6, 9 and 12). Each wall comprises a plurality of transverse diagonal ribs 53, which are mitered together at their ends and secured together by bolts 54 (Fig. 9) to form a pair of relatively interposed conveyor flights along the inner walls of the drum in the nature of a double-thread, rectangular, helical screw. Adjacent ribs of the two flights, which are separately designated as 53a and 53b (Figs. 6, 9 and 12), are spaced apart laterally by a distance less than the length of the beans which it is desired to process in the apparatus. In other words the pitch of the double screw flight is less than the average length of the beans to be processed. Therefore, a promiscuous mass of beans falling into the interior of the revolving drum through the intake or charging elbow 47 will tend to arrange themselves lengthwise of the grooves between adjacent ribs or threads of the two flights.

A side cover plate 55, which may be of cast iron or steel with smooth inner surface, is secured, by screws 57, lengthwise over one-half of each of the four sides of the double flights 53a and 53b (Fig. 12). These side cover plates hold the flights rigidly in position and unite the drum body into a strong hollow flat sided structure of rectangular cross sectional shape. A securing flange 58 is formed integrally along the outer marginal edge of each of the side cover plates 55, and has threaded openings therein to receive screws 59 (Figs. 6 and 9) for mounting a plurality of slotted shear plates 60 (Figs. 6, 9 and 10) which cover the other half of each side of the rectangular body portion of the drum from that covered by the side cover plates 55. The shear plates 60 also are secured to the flight ribs 53a and 53b by screws 59 and 61 (Figs. 6 and 9). The screws 61 are inserted through complementary countersunk notches 61a and 61b (Figs. 10 and 11) provided in opposite sides of the shear plates.

The shear plates 60 preferably are in the form of parallelograms with their longer edges disposed at an acuate angle with respect to a transverse plane normal to the longitudinal axis of the drum. This angle corresponds substantially to the angle at which the ribs 53 are disposed relatively to such transverse plane. A plurality of slotted holes 62 (Figs. 6, 10 and 11) are provided in each of the shear plates parallel to each other and to the side edges of the shear plates. These holes are of a size to protrude the tip end of a bean therethrough, while retaining the bean within the drum. Each shear plate is adapted to span the space between adjacent ribs 53, and to fit closely together in edgewise abutment with each other. End filler plates 63 (Fig. 6) are provided endwise beyond each row of the shear plates to provide a tight closure between the last shear plate in each row thereof and the heads of the drum.

The annular drum heads 51 and 52 are bolted onto the ends of the drum body portion 50 by bolts 64 which pass through holes in the heads of the drum and are screwed into threaded holes in brackets 67 and 68, one of each of which is mounted at each end of each side of the drum body. The brackets 68 have an additional function to that of securing the end plates to the drum body, namely, that of providing a slidable support for a snipping or shear blade mounting rod as will be described later herein.

The head 51 on the charging or intake end of the drum comprises a flat annular flange 65 with a concentric tubular collar 69 extending endwise therefrom, the collar having a bearing track 70 machined around its outer end. This machined outer end portion of the tubular collar is inserted in an externally channeled mounting ring 71 secured by bolts 72 (Figs. 4 and 6) to the charging elbow mounting bracket 49. A pair of drum supporting rollers 74 and 75 (Figs. 4 and 5) are journaled on pins 77 (Fig. 5) which are pillowed in box brackets 78 extending radially outwardly and downwardly from opposite sides of the lower portion of the mounting ring 71, and are secured in position therein by bearing caps 79. The machined peripheral track face 70 of the endwise extending tubular collar 69 is supported on these rollers for free rotating movement within the mounting ring 71 and free of frictional contact therewith.

The discharge head 52 of the drum may be of cast metal, and comprises a flat annular flange 80 (Figs. 1, 2, and 3) having a central discharge opening 86 therein. An endwise extending four armed spider 81, with a central hub portion 82, formed integrally therewith, spans the central discharge opening in the annular flange portion 80. A stub shaft 83 is mounted axially in the hub portion 82, is keyed thereto, and extends outwardly therefrom. The stub shaft 83 is journaled in a gear casing 84 mounted on the transverse end frame member 23.

A worm gear 85 is keyed to the stub shaft 83 and is enclosed in the gear casing 84. A worm drive pinion 87 is in toothed driving engagement with the worm gear 85, and is keyed to a drive shaft 88 which is journaled in bearings transversely of the lower end of the gear case. The shaft 88, and thereby the worm pinion 87, the worm gear 85 and the drum itself, is driven through a V belt 89 by an electric motor 90 (Figs. 1, 2 and 3) mounted on a frame extension 91 secured to the transverse end frame member 23. A takeoff conveyor 92 which may be of an ordinary belt type and power driven in a usual manner is mounted beneath the discharge end of the drum to receive the beans discharged thereby and transport them to a desired destination.

The two rollers 74 and 75 and the stub shaft 83 thus support the drum for rotation about its longitudinal axis. The required direction of drum rotation is determined by the location of the shear plates 60 on the sides of the drum and is indicated as being in the direction of the arrow in Figs. 9 and 13 to 15A, inclusive, so that the beans will slide endwise along the trough-like grooves or channels between adjacent ribs forming the flights 53a and 53b toward the perforations in the shear plates 60 upon each quarter turn of the drum. The hand of the threads or flights 53a and 53b is such as to advance the beans from the charging toward the discharge end of the rotating drum.

A snipping blade assembly E is mounted centrally lengthwise over each row of shear plates 60 on the drum, and comprises a blade mounting rod 93 (Fig. 1) of rectangular cross sectional shape, a plurality of spring pressed blade assemblies 94 affixed to the rod, and cam follower rollers 97 and 98 rotatably mounted one on each end of the rod 93.

A pair of blade support rod actuating cams 99 and 100, to be described in detail later herein, are mounted one beyond each end of the drum to reciprocate each blade assembly E lengthwise of its row of shear plates at predetermined stages in its rotative cycle to snip off the tips of beans protruding through the slots in the shear plates. Each blade support rod 93 extends endwise through openings in both of the drum head annular flange portions 65 and 80, and is mounted for lengthwise slidable movement in notches 101 (Figs. 8 and 9) in the upper ends of the combined rod support and drum head securing brackets 68 which are bolted to the end filler plates 63 (Fig. 6).

The blade mounting rods are retained in the notches in the brackets 68 by caps 102 which are secured to their respective brackets by screws 103 (Figs. 6 and 7). A notched central rod support bracket 104, which may be similar to the end brackets 68, is provided slidably to support each blade support rod 93 intermediately of its ends.

The snipping or shear blade assemblies 94 (Figs. 6 and 9) are mounted at equally spaced intervals along each rod 93. Each blade assembly comprises a fitting 107 with a notch in its under side (Fig. 9) adapted closely to saddle the rod 93. Each fitting 107 is secured to the rod by a bolt 108 which passes through a hole provided therefor in the fitting 107 and is screwed into a threaded hole in the rod.

Each blade assembly fitting 107 has two similar pairs of pin mounting arms 109 and 110 extending laterally from opposite sides thereof. A blade supporting pin 111 is mounted for axial slidable movement in aligned holes provided in the outer ends of each pair 109 and 110 of these arms, each blade support pin having a reduced upper portion which is surrounded by a coil spring 112. This spring is held in compression between the outermost arm 110 and the offset shoulder between the inner portion of the pin and its reduced outer end portion, so as to exert an endwise thrust on the pin toward the shear plates 60 over which the rod 93 is centrally mounted. A shear blade 113, of thin tool steel, has a pair of drilled bosses 114 on its outer side adapted to register with the blade supporting pins 111. Each blade support pin 111 has an extension 115 of reduced diameter on its inner end adapted to enter the holes drilled in the blade bosses 114 to hold the blades in position and to exert a resilient thrust on the blades toward the shear plates.

The edges of the shear blades are beveled toward the shear plates and are sharpened, while the walls of the slotted openings in the shear plates (Fig. 11) are beveled on their inner sides, so that when the blades 114 are reciprocated back and forth across the shear plates by the operation of the rods 93, a shearing action will be achieved which will snip off any bean tips which may protrude through the perforations in the shear plates beyond the outer surface thereof. The blade assemblies 94 preferably are spaced apart a distance equal to the width of the shear plates as shown in Fig. 6, and in such case the reciprocal stroke of each rod 93 is of a length to cause each shear blade to traverse one shear plate.

The blade support rod actuating cam 99 on the discharge end of the machine (Figs. 7 and 8) comprises a triangular cam plate 117 curved to conform with the circular path of the cam follower rollers 97 upon rotation of the drum. This triangular cam is secured by bolts 118, and an intermediate supporting pad 119, to a pivotally mounted cam support bar 120. The cam support bar 120 is pivoted on a bolt 121 mounted on the central longitudinal member 21 (Fig. 8) of the main frame. The free end of this pivoted cam support bar 120 is mounted for lateral slidable movement in a notch 122 in a guide plate 123 which is welded to extend upwardly from the upper side of the outer longitudinal frame member 22. The notch 122 permits limited pivotal movement of the cam mounting bar 120, which is biased inwardly into the notch by a coil tension spring 124.

The curved triangular plate 117 is positioned to engage the cam follower roller 97 of each snipping assembly E at a stage in the rotative movement of the drum when the tips of the beans are protruding to their maximum degree through the perforations in the shear plates 60 associated with that particular snipping assembly.

The spring biased pivotal mounting of the cam plate mounting bar 120 is provided as a safety measure. In the event that the action of one or more of the shear blades should be blocked, however, as might be the case if a piece of metal should protrude through a shear plate opening and offer substantial resistance to the reciprocal movement of the blade supporting rod 93, the pivoted bar and its supported cam plate 117 would be swung outward against the tension of the spring 124 by the action of the cam plate on the cam follower roller.

After the cam plate had passed beyond the roller, after thus having been swung outward, the spring 124 would return the bar 120 to its seat in the notch 122 with an audible "click" which would be a signal to the operator to remove the obstruction. If desired, an ordinary type of automatic cutoff switch and relay, not shown, can be associated with the movement of the pivoted bar 120 in a well known manner to shut down the machine in the event the bar 120 should be displaced substantially from its seat in the notch.

The blade support rod return cam 100 on the other end of the machine comprises a curved cam plate 125 which is generally similar, but opposite, to the rod actuating cam plate 117. The return cam plate 125 is fixedly mounted on a bracket 127 bolted to the transverse end member on the opposite end of the main frame 24. This return cam engages the cam follower rollers 98 on the opposite ends of the blade mounting rods 93 from the actuating cam 99 to return the rods to their normal positions at a stage in the rotative cycle of the drum when no beans or foreign material are positioned to protrude from the shear plate perforations 62. Therefore, it has been found unnecessary to mount this return cam resiliently. If desired, however, a resilient cam mounting arrangement similar to that disclosed for the actuating cam 99 may be employed also for the rod return cam 100.

In the modified form of the invention shown in Fig. 16 (Sheet 5) the drum C' is generally similar to the drums C and D of the mechanism illustrated in the remaining figures of the drawings, with the exception that the rows of shear plates 60a and 60b of the modified drum shown in Fig. 16 are mounted on opposite instead of adjacent sides of the drum.

With this modified arrangement the drum instead of being driven to rotate continuously in one direction as in the form of the invention shown in Figs. 1, 2, and 3, is driven so as to oscillate back and forth, thereby causing the beans in the troughs or channels therein to slide first toward the shear plates 60a, whereupon the associated snipping blade mechanism is actuated to snip off the tips of beans protruding through the perforations in the shear plates 60a, and then is swung back in the opposite direction to cause the beans to slide endwise toward the shear plates 60b, whereupon the protruding tips on the other ends of the beans will be snipped off by actuation of the blade actuating mechanism associated with the latter shear plates. After a required number of oscillations in this manner the drum can be rotated to advance the beans by suitable drive mechanism of a well known type. If desired, the top of the drum may be left uncovered, and after a suitable number of oscillations to insure adequate snipping, the snipped beans can be dumped out by inverting the thus open topped drum.

*Operation*

The operation of the embodiment of the invention illustrated in Figs. 1 to 15 is as follows:

A supply of beans is dumped into the feed hopper 42 of the charging mechanism F (Fig. 1). From this supply the slatted elevator belt 29 carries the beans at a substantially uniform rate up the elevator and over the top thereof, discharging them into the divided intake casing 43 of the machine from which substantially equal amounts of the beans are fed through the feed elbows 47 and 48 into the snipping drums C and D. The rate of travel of the elevator is controlled by means of the variable sped reducer 34, a preferred maximum relative speed between the elevator and the snipping mechanism being such that the beans will not quite fill the channels between adjacent ribs 53 of the flights 53a and 53b of the double screw conveyor.

Referring to the diagrammatic illustration of Figs. 13 and 13A, it will be noted that the beans, being, as stated previously herein, longer than the distance separating adjacent ribs of the conveyor flights, tend to arrange themselves lengthwise in the spaces between adjacent ribs. Therefore at substantially each one-quarter turn of the drum, as the angle of tilt of the troughs or channels between the ribs passes beyond the limiting angle of friction between the beans and the channel walls, the beans slide endwise along the channels until they are arrested by engagement with the shear plates 60, where the tips of the endwise positioned beans tend to protrude through the perforations in the shear plates.

At this stage in the rotative cycle, when the beans are protruding through the shear plate perforations to a maximum degree, the actuating cam 99 (Figs. 7 and 8) engages the cam follower roller 97 on the blade actuating rod associated with the row of shear plates through which the bean tips are protruding, and moves the snipping blades of that assembly across their associated shear plates, severing the protruding tips.

Some beans are curved excessively, as illustrated at 128 in Figs. 13 to 15A, so that their tips do not initially protrude through a slotted opening in the shear plates. However, it has been noted that such beans usually are snipped on both ends when discharged from the machine. This result has probably been due to a tendency for these curved beans frequently to position themselves as shown in Figs. 15 and 15A, where one or both of their tips protrude through the shear plate openings and are snipped off.

As the drum continues to rotate from the position of Fig. 13, the ends of the beans from which the tips have been snipped tend to be retained in the beveled slotted openings in the shear plates, and the beans are carried upward on the shear plates until they are tilted beyond the vertical to the position of Fig. 14, whereupon the beans will tumble over endwise and then, as further rotation of the drum sufficiently tilts the troughs or channels into which they fall, will slide endwise along the channel with their unsnipped tips directed toward the next row of shear plates.

When these beans again are arrested in their endwise sliding movement by the next row of shear plates, as illustrated in Fig. 15, these unsnipped tips will protrude through the shear plate openings in the manner previously described for Fig. 13 and will be snipped off by the subsequent timely operation of the blades 113 through the operation of the actuating cam 99 and cam follower roller 97.

Each blade assembly will of course be returned to its normal or unactuated position by the return cam 100 prior to the time the snipping blade rod roller again is engaged by the actuating cam 99.

The operation of the modified form of the invention illustrated in Fig. 16 (Sheet 5) will be obvious from an understanding of the operation of the foregoing together with the description of the modified form in the body of the present specification.

The positive directing action of the transversely disposed troughs or channels in the present invention plus the positive end-for-end reversing action on the beams, results in the discharge of a very high percentage of beans with both ends snipped, and also permits a high rate of production. Both of these features are most important in meeting the present day demands of the canning industry for a high quality pack combined with a high rate of output.

The present description of the invention is directed to a mechanism handling beans. However it will be obvious to those familiar with the art that the invention can also be used for snipping other elongated pointed products requiring such processing and the term "bean" as used throughout is intended to include such other products. It will also be obvious that various changes and modifications may be made in the details of the mechanism without departing from the spirit and scope of the appended claims.

Having thus described the invention, what I claim as new and desire to protect by Letters Patent is as follows:

1. A bean snipper comprising a rotary drum having a bean supporting flat side of a width greater than the length of the beans for the beans to slide thereover with their lengths in substantially transverse relation to the axis of drum rotation, a bean intercepting shear plate disposed adjacent a lateral edge of said flat side in angular relation thereto and in the path of travel of the beans, said shear plate having a slot therein adapted to protrude therethrough the tip of a bean intercepted thereby while retaining the bean, means for guiding the beans along said flat side during their endwise sliding movement thereover towards said bean intercepting shear plate upon a predetermined rotation of said drum, a shear blade operatively mounted upon said rotary drum in shearing relation to said shear plate, and means disposed in the operational path of said shear blade and adapted to co-act therewith for imparting shearing movement thereto relatively to said shear plate at the stage of drum rotation when the tips of the intercepted beans protrude through the shear plate slot to snip off said protruding bean tips.

2. A bean snipper comprising a pivotally mounted receptacle, a bean supporting flat side of a width slightly greater than the length of the beans on said receptacle over which side the beans slide with their lengths in substantially transverse relation to the pivotal axis of the receptacle, a bean intercepting shear plate on said receptacle disposed adjacent said flat side in substantially perpendicular relation thereto and in the path of travel of the beans, said shear plate having an opening therein adapted to protrude the tip of a bean therethrough while retaining the bean, means for guiding the beans along said flat side during their endwise sliding movement thereon towards said shear plate for interception thereby and the protrusion of the tips of intercepted beans through the opening thereof upon a predetermined pivotal movement of said receptacle, shear means operatively mounted upon said receptacle in shearing relation to said shear plate, and means disposed in the operational path of said shear means and adapted to co-act therewith for imparting shearing movement thereto relatively to said shear plate during the interception of said beans by said shear plate to snip off protruding bean tips.

3. A bean snipper comprising a tiltable receptacle, a bean supporting flat side of a width greater than the length of the beans on said receptacle over which side the beans slide with their lengths in substantially transverse relation to the tilting axis of the receptacle, a bean intercepting shear plate on said receptacle disposed adjacent said flat side in substantially perpendicular relation thereto and in the path of travel of the beans, said shear plate having a slot therein adapted to protrude the tip of an intercepted bean therethrough while retaining the bean, means for tilting the receptacle to incline the flat side of same to cause the beans on said flat side to slide endwise towards said shear plate for interception thereby, means for guiding the beans along said flat side during their endwise sliding movement thereon towards the shear plate upon a predetermined tilting movement of the receptacle, shear means operatively mounted upon said receptacle in shearing relation to said shear plate and for transverse shearing movement relatively thereto, and means disposed in the operational path of said shear means and adapted to co-act therewith for imparting shearing movement thereto during tilting movement of said receptacle to snip off protruding bean tips.

4. A bean snipper comprising a support, a drum mounted upon said support to rotate about a substantially horizontal axis, said drum having a substantially flat bean supporting side wall of a width greater than the length of the beans over which side the beans slide with their lengths in approximately transverse relation to the axis of drum rotation, a plurality of bean guiding ribs mounted to extend inwardly from said flat side wall, said ribs being spaced apart by a distance less than the length of the beans to be guided to thus form with said flat side wall a chute along which the beans are adapted to slide endwise, an apertured shear plate disposed transversely across said chute between adjacent ribs in substantially perpendicular relation to its bottom wall whereby beans sliding endwise along said chute are intercepted and their leading tips are caused to protrude through the apertures of said shear plate while retaining the beans, means for rotating said drum to tilt the chute and thereby cause the beans guided lengthwise therein between adjacent ribs to slide endwise by gravity towards said apertured shear plate to protrude upon interception thereby their tips through the apertures thereof, shear means operatively mounted upon said drum in shearing contact with said apertured shear plate, and means disposed in the arcuate path of operational travel of said shear means and adapted to co-act therewith for imparting shearing movement thereto at a predetermined rotative position of said drum to snip the protruding tips from said beans.

5. A bean snipper comprising a support, a drum mounted thereon to pivot about a substantially horizontal axis, a plurality of bean guiding chutes carried by said drum and disposed substantially at right angles to said drum axis, a bean intercepting shear plate disposed transversely across the ends of said chutes in substantially perpendicular relation to the bottom walls thereof, said shear plate having a series of apertures therein to permit the tips of beans intercepted thereby to protrude through said apertures while retaining the beans, means for pivotally moving said drum about its axis to tilt the chutes and thereby cause the beans guided between said ribs to slide endwise along said chutes toward and against said bean intercepting plate to protrude their tips through the apertures thereof, shear means operatively mounted upon said drum to shearingly cooperate with the marginal edges of said apertures, and means disposed in the operational path of travel of said shear means and adapted to co-act therewith for imparting shearing movement thereto at a predetermined pivotal position of said drum to snip the tips of the intercepted beans protruding through the apertures of said shear plate.

6. A bean snipper comprising a frame, a plurality of bean guiding chutes arranged in side by side relation and mounted upon said frame to tilt endwise about a substantially horizontal axis, a perforated bean intercepting shear plate disposed transversely of said chutes in substantially perpendicular relation to the bottom walls thereof to thereby effect interception of the guided beans in said chutes, said shear plate having perforations of a size to permit the tips of the beans intercepted thereby to protrude therethrough while retaining the beans, means for tilting the chutes to cause the beans guided therein to slide endwise towards and against said bean intercepting shear plate to protrude their tips through the perforations thereof, shear means operatively supported from the bean guiding chutes for shearing cooperation with said shear plate, and means disposed in the operational path of travel of said shear means and adapted to co-act therewith for imparting shearing movement thereto at a predetermined tilted position of the chutes to snip the tips of intercepted beans protruding from the perforations of the shear plate.

7. A bean snipper comprising a rotatable drum having a bean supporting flat side whereover the beans slide with their lengths in substantially transverse relation to the axis of drum rotation, members forming a plurality of narrow bean guiding channels upon the inner face of said flat side, a beam intercepting shear plate disposed transversely across the ends of said channels in substantially perpendicular relation to the plane of said flat side for abutment by beans sliding endwise along said channels to thereby arrest sliding movement of same, said shear plate having openings therein adapted to allow the tips of the arrested beans to protrude therethrough while retaining the beans, drive means for rotating said drum to tilt said flat side and its correlated bean guiding channels between substantially horizontal and upright positions to thus cause the beans to slide along said channels until arrested by the shear plate and to protrude their tips through the shear plate openings, a shear blade operatively mounted upon said rotatable drum exteriorly of said shear plate and shearingly movable across the openings thereof to sever protruding bean tips, and stationarily mounted blade actuating means disposed in the operational path of travel of the shear blade for co-action therewith to impart shearing movement thereto at a predetermined stage in the rotative movement of said drum when the tips of the intercepted beans protrude through the shear plate openings.

8. A bean snipper comprising a tiltable bean container having a bean supporting flat side whereover the beans slide with their lengths in substantially transverse relation to the tilting axis of the bean container, members forming a plurality of narrow bean guiding channels upon the inner face of said flat side, a bean intercepting shear plate disposed to extend transversely across the ends of said channels in substantially perpendicular relation to the plane of said flat side for abutment by means sliding endwise along said channels to thus arrest sliding movement of same, said shear plate having openings therein to allow the tips of the arrested beans to protrude therethrough while retaining the beans, means for operating said bean container to effect tilting of said bean guiding channels lengthwise and thus cause the beans therein to slide by gravity endwise therealong and protrude their tips through the shear plate openings, a shear blade operatively mounted upon said bean container exteriorly of said shear plate and shearingly movable across the openings of said plate to sever protruding bean tips, and stationarily mounted blade actuating means disposed in the operational path of travel of said shear blade for coaction therewith to impart shearing movement thereto at a predetermined stage in the tilting movement of the bean container when the tips of the arrested beans protrude through the shear plate openings.

9. A bean snipper comprising a rotatable bean container of flat sided configuration, each side of said container having a flat imperforate bean supporting plate extending over substantially half the width thereof and whereon the beans slide with their lengths in substantially transverse relation to the axis of container rotation, a complemental flat bean intercepting shear plate on each side of said container in the plane of and in abutment with the leading edge of its correlated imperforate plate in the direction of container rotation and being of a width to complete said side, said shear plate having openings therein adapted to protrude therethrough the tips of beans intercepted thereby while retaining the beans, helical bean guiding ribs having successive straight portions thereof secured in oblique relation to the inner faces of said imperforate plates to form therewith a substantially continuous helical bean guiding channel within said container of lesser width than the length of the beans to be guided therein, means for rotating said container to vary the tilt of each successive portion of said channel to cause the beans to slide endwise therealong towards the succeeding shear plate for interception thereby and the protrusion of the leading tips of the beans through the openings thereof, shear blade means operatively mounted upon said container in shearing contact with said shear plates exteriorly thereof and shearingly movable across said openings to sever bean tips protruding therethrough, and stationarily mounted blade actuating means disposed in the operational path of travel of said shear blades and adapted to co-act therewith for imparting shearing movement thereto at a predetermined stage in the rotative movement of said container to effect bean tip severance as aforesaid, said drum rotation thereafter tumbling the beans endwise for end to end reversal in said channel and causing said reversed beans to slide therealong towards the suceeding shear plate to be intercepted thereby and protrude the tips on their other ends through the openings in said shear plate for sequential severance as aforesaid.

10. A bean sniper comprising a support, a flat-sided and open-ended drum of polygonal cross section mounted upon said support to rotate about an inclined axis, each flat side of said rotating drum having, in the direction of drum rotation, a trailing longitudinally disposed imperforate bean supporting portion whereover the beans slide with their lengths in substantially transverse relation to the axis of drum rotation, said flat side also having a similarly disposed bean shearing portion having a plurality of openings therein of a size to allow the tips of beans to protrude therethrough while retaining the beans, charging means mounted to introduce beans into one open end of said drum, a helix of polygonal cross-section disposed within said drum to form with the side walls thereof a substantially continuous chute for conveying the beans from the charging end of the drum to and through the other end thereof, said chute being of a width less than the lengths of the beans to be conveyed therein so that said beans are caused to slide endwise along said chute when the drum is rotated, drive means to rotate said drum in a direction to cause the beans therein to slide endwise along successive sections of said chute towards and against the bean shearing portions on the walls of said drum to protrude their leading tips through the openings thereof, shear means operatively mounted upon said drum in shearing contact with and exteriorly of its bean shearing portions for shearing movement across the openings of same to sever the protruding bean tips, and stationarily mounted actuating means disposed in the operational path of travel of said shear means and adapted to co-act therewith for imparting shearing movement thereto at a predetermined stage in the rotative cycle of said drum to effect bean tip severance as aforesaid.

11. A bean snipper comprising a support frame, a bean container pivotally mounted upon said support frame and having a longitudinally disposed imperforate bean supporting flat side of a width greater than the length of the beans and wherever the beans slide with their lengths in substantially transverse relation to the pivotal axis of said container, means for pivotally moving said container about a substantially horizontal axis in recurring cycles to tilt said bean supporting flat side between substantially horizontal and upright positions, a bean intercepting portion on said container disposed adjacent an edge of said flat side in substantially perpendicular relation thereto and in the path of travel of the beans sliding thereover, said portion having a plurality of shear openings therein of a size to allow the tips of the intercepted beans to protrude therethrough while retaining the beans, means for guiding the endwise sliding movement of the beans upon said flat side towards said bean intercepting portion during the recurring tilting cycles of said flat side, shear means operatively mounted upon said container in shearing contact with and exteriorly of said bean intercepting portion for shearing movement across the openings thereof to sever the tips of beans protruding therethrough, and stationarily mounted means disposed in the operational arcuate path of travel of said shear means and adapted to co-act therewith for imparting shearing movement thereto at predetermined stages in the pivotal cycle of movement of said container when the tips of the intercepted beans protrude through the openings of the bean intercepting portion.

12. A bean snipper comprising a drum rotatable about an inclined axis, and having a plurality of bean supporting flat sides of a width greater than the beans to be snipped whereover the beans are adapted to successively slide with their lengths in substantially transverse relation to the axis of drum rotation, said flat sides being disposed in parallel relation to the drum axis with adjacent sides thereof in angularly intersecting relation, charging means for feeding beans at a controlled rate into the upper end of said drum, guide means mounted interiorly of said flat sides and extending in closely adjacent relation substantially transversely of each of said flat sides to cause the beans to slide endwise down successive sides of the drum on rotation thereof, snipping means operatively carried by each flat side of said drum and mounted thereon in adjacent and parallel relation to the intersections of adjacent flat sides, said snipping means being disposed in the path of travel of the sliding beans and being adapted to arrest the sliding movement of same and to receive and sever the tips of the beans arrested thereby, stationarily mounted means disposed in the operational paths of travel of said snipping means and adapted to co-act therewith for imparting snipping movement thereto at predetermined points in the rotative cycle of said drum, said snipping means being adapted to retain the beans against direct sliding movement from one flat drum side to the next whereby the beans topple over and are reversed, end for end, after each successive snipping operation to cause the beans to slide in endwise reversed relation upon the succeeding flat side slightly prior to and continuing during the time each successive intersection between adjacent sides is passing its bottom dead center of drum rotation.

13. A bean snipper comprising a rotatable drum having a sequence of flat sides of a width greater than the length of the beans and whereover the beans are adapted to successively slide with their lengths in substantially transverse relation to the axis of drum rotation, guide means interiorly of said drum for imposing positive and controlled guiding action upon beans sliding endwise along the interior surfaces of successive flat sides of the drum upon rotation thereof, tip snipping means operatively carried by each flat side of said drum in advance thereof in the direction of drum rotation and in angular relation to the preceding flat side with which it cooperates to arrest movement of the beans sliding thereover, said snipping means having an opening adapted to receive the tip portion only of a bean directed endwise thereinto, stationarily mounted means disposed in the operational paths of said tip snipping means and adapted to co-act therewith for imparting snipping movement thereto at a predetermined point in the rotative cycle of said drum, said opening and said guide means being adapted to retain the bean in arrested position until said bean is carried beyond a point in the rotation of said drum whereat it topples over endwise in the guiding means onto the succeeding flat drum side in end for end reversed position for sliding movement therealong.

14. In a bean snipper, the combination comprising: a rotatable drum having a longitudinally disposed perforate portion in the side walls thereof, the perforations of said portion being of a size to allow the tips of the beans to protrude therethrough while retaining the beans, a longitudinally disposed shear blade support rod mounted on said drum for reciprocative movement over the perforations of said perforate portion, a plurality of blade support brackets secured to said rod at spaced intervals, a bean tip shearing blade mounted upon each of said brackets in shearing contact with said perforate portion, means for retaining the blade against lateral displacement from said bracket, spring means cooperating with said last mentioned means for biasing the blade toward said perforate portion, and stationarily mounted means disposed in the operational path of travel of said blade support rod and adapted to co-act therewith for reciprocating the same in recurrent strokes in timed relation to the rotation of said drum to thereby snip off protruding bean tips.

15. In a bean snipper, the combination comprising: a rotatable drum, a shear plate seated within the side walls of said drum in oblique relation to a plane perpendicular to the axis of drum rotation, said shear plate having therein a plurality of uniformly spaced rows of outwardly convergent elongated slots disposed in substantially parallel relation to the sides thereof and being of a width to allow the tips of the beans to protrude therethrough while retaining the beans, a longitudinally disposed shear blade support rod mounted upon said drum for transverse reciprocative movement over the slots of said shear plate, a blade support bracket secured to said rod in the oblique plane of said shear plate, a bean tip shearing blade mounted upon said bracket for shearing contact with said shear plate, means for retaining the blade against lateral displacement from said bracket, spring means cooperating with said last mentioned means for biasing the blade toward said shear plate, and stationarily mounted means disposed in the operational path of said reciprocative blade support rod and adapted to co-act therewith for reciprocating the same in recurrent strokes in timed relation to the rotation of the drum whereby the bean tips protruding from the shear plate slots are snipped off.

16. In a bean snipper, the combination comprising: a rotatable drum, a longitudinally disposed row of shear plates seated within the side wall of said drum in oblique relation to a plane perpendicular to the axis of drum rotation, each of said shear plates having therein a plurality of uniformly spaced rows of outwardly convergent elongated slots disposed in substantially parallel relation to the sides thereof and being of a width to allow the tips of the beans to protrude therethrough while retaining the beans, a longitudinally disposed shear blade support rod mounted upon said drum in substantially median alignment with said row of shear plates and for reciprocative movement over the slots thereof, a blade support bracket associated with each shear plate and secured to said rod in the oblique plane of its shear plate, a bean tip shearing blade mounted upon said bracket for shearing contact with its correlated shear plate, means for retaining the blade against lateral displacement from said bracket, spring means cooperating with said last mentioned means for biasing the blade toward said shear plate, and stationarily mounted means disposed in the operational path of said reciprocative blade support rod and adapted to co-act therewith for reciprocating the same in recurrent strokes in timed relation to the rotation of the drum to thereby snip off protruding beans tips.

17. In a bean snipper, the combination comprising: a drum supporting frame, a drum mounted for rotation about its axis on said supporting frame, a shear plate seated within the side walls of said drum in oblique relation to a plane perpendicular to the axis of drum rotation, said shear plate having herein a plurality of uniformly spaced rows of outwardly convergent elongated slots disposed in substantially parallel relation to the sides thereof and being of a width to allow the tips of the beans to protrude therethrough while retaining the beans, a shear blade support rod mounted longitudinally upon said drum for transverse reciprocative movement over the slots of said shear plate, a cam follower roller rotatably mounted upon each end of said support rod, a blade support bracket secured to said rod in the oblique plane of said shear plate, a bean tip shearing blade mounted upon said bracket for shearing contact with said shear plate, means for retaining the blade against lateral displacement from said bracket, spring means cooperating with said last mentioned means for biasing the blade toward said shear plate, a blade support rod actuating cam mounted upon said drum supporting frame and disposed in the operational path of one of the cam follower rollers of said blade support rod and adapted to co-act therewith for imparting shearing movement to said shearing blade in timed relation to the rotation of the drum to thereby snip off bean tips protruding from the latter, and a second blade support rod actuating cam mounted upon said drum supporting frame and disposed in the operational path of the other cam follower roller of said blade support rod and adapted to co-act therewith for returning said rod to its normally retracted position.

18. The combination as substantially defined in claim 17, characterized in that said first mentioned blade support rod actuating cam is mounted upon the drum supporting frame closely adjacent to but beyond the vertical axial plane of the drum in the direction of drum rotation.

19. The combination as substantially defined in claim 17, characterized in that said first mentioned blade support rod actuating cam is pivotally mounted and spring biased for permitting backward movement of said rod when the bean tip shearing blade encounters an obstruction during a shearing operation thereof.

20. A bean snipper shear plate having a rhomboidal contour and a plurality of uniformly spaced rows of outwardly convergent elongated slots formed therein.

21. A shear plate as defined in claim 20, characterized in that the uniformly spaced rows of slots are longitudinally disposed therein.

22. A bean snipper comprising a narrow, bean guiding channel, a bean intercepting shear plate disposed transversely across an end of said channel in substantially perpendicular relation to the bottom wall thereof to arrest the movement of beans sliding endwise along said channel, said shear plate having openings therein of a size to protrude the tips of beans therethrough while retaining the beans, drive means for tilting said channel to cause the beans to slide endwise therealong to arrested position against said shear plate with their tips protruding through the shear plate openings, a shear blade operatively supported from said bean guiding channel exteriorly of said shear plate and shearingly movable across the openings thereof to sever protruding bean tips, and stationarily mounted blade actuating means disposed in the operational path of travel with said shear blade for co-action therewith to impart shearing movement thereto at a predetermined stage in the tilting of said channel when the tips of the arrested beans are protruding from said shear plate openings.

23. A bean snipper comprising a narrow bean guiding channel wherein the beans are adapted to slide endwise, a shear plate disposed transversely across each end of said channel in substantially perpendicular relation to the bottom wall thereof to arrest the movement of beans sliding endwise along said channel in either direction, said shear plates having openings therein of a size to protrude the tips of the arrested beans therethrough while retaining the beans, drive means for tilting said channel alternately in opposite directions from the horizontal to an inclined angle sufficient to cause the beans to slide by gravity endwise along said channel to arrested position against a shear plate to protrude their tips through the shear plate openings, a shear blade operatively supported from said channel exteriorly of each of said shear plates and shearingly movable across the openings of its correlated shear plate to sever protruding mean tips, and stationarily mounted blade actuating means disposed in the operational paths of travel of said shear blades for co-action therewith to impart shearing movement to each of said blades at predetermined stages in the tilting of said channel when the tips of the arrested beans protrude through the openings of the shear plate associated with the blade being actuated.

24. A bean snipper comprising a narrow bean guiding channel portion of substantial length, and of lesser width than the length of the beans to be guided for endwise sliding movement therein, a pair of sheer plates disposed one adjacent each end of said channel portion in substantially perpendicular relation to the bottom wall thereof to arrest movement of beans sliding endwise therealong, said shear plates having openings therein of a size to allow the tips of beans arrested by the shear plates to protrude therethrough while retaining the beans, drive means for tilting said channel portion to an inclined angle sufficient to cause the beans to slide by gravity one end first along said channel to arrested position against a shear plate to protrude their tips on said one end through the shear plate openings, a shear blade operatively supported from said channel portion exteriorly of each shear plate and shearingly movable across the openings of its correlated shear plate to sever protruded bean tips, and stationarily mounted blade actuating means disposed in the operational path of travel of said shear blades for co-action therewith to impart shearing movement to said blades at predetermined stages in the tilting movement of said channel during which the tips of the arrested beans are protruding from the shear plate openings, said drive means thereafter tilting said channel to cause the beans to slide other end first toward the other of said shear plates and protrude the tips on their other ends through the openings in said other shear plate.

25. A bean snipper comprising a bean container, a plurality of narrow bean guiding channels therein along which the beans are adapted to slide endwise, shear plates disposed transversely across both ends of each channel in substantially perpendicular relation to the bottom wall thereof to arrest the movement of beans sliding endwise along said channels, said shear plates having openings therein of a size to allow the tips on one end of said beans to protrude therethrough while retaining the beans, drive means for tilting said channels to an inclined angle sufficient to cause beans therein to slide by gravity one end first therealong to arrested position against the downwardly tilted shear plate to protrude their tips on said one end through the shear plate openings thereof, means for tilting said channels to cause beans therein to slide other end first along said channels to protrude their tips on said other end through the openings of the other downwardly tilted shear plate, a snipping blade operatively mounted upon said container in snipping contact with each shear plate, and stationarily mounted means disposed in the arcuate path of operational travel of said snipping blades for co-action therewith to actuate the same at predetermined points in the tilting of said container to snip off the tips of beans protruding through said plates.

26. A bean snipper comprising a support, a drum mounted for rotation about an inclined axis on said support, the ends of said drum being open, charging means mounted to introduce beans into the upper end of said drum, guide ribs projecting into the drum and spaced apart by a distance less than the length of the beans to be snipped for conveying the beans in endwise sliding arrangement along said drum to and through the lower end of said drum, a row of perforated shear plates mounted to extend lengthwise of a wall of said drum and disposed at a bean arresting angle across the path of the endwise sliding beans, said shear plates being spaced apart a distance substantially greater than the length of beans to be snipped, to protrude the tips of arrested beans through the perforations in said shear plates, a shear blade support rod mounted in said drum for endwise slidable movement lengthwise over said row of shear plates, means carried by said drum support and disposed in the operational path of travel of said blade support rod to co-act therewith for reciprocating the rod in recurrent strokes in timed relation to the rotation of said drum, a plurality of blade support brackets secured to said rod at spaced intervals, a blade mounted on each of said brackets between the bracket and a shear plate and laterally adjacent a shear plate opening, means for retaining the blade against lateral displacement from the bracket during reciprocal movement of the rod to move said blade across a shear plate opening, and spring means cooperating with said last mentioned means to bias the blade toward the shear plate.

27. A bean snipper comprising a receptacle having a plurality of narrow, elongated guide ways therein, means for introducing beans into said receptacle for guidance lengthwise of said guide ways, a plurality of tip receiving means at the ends of said guide ways adapted to arrest beans sliding along said guide ways and to receive the tips of beans therein, means for tilting said receptacle to incline the guide ways toward the tip receiving means for controlled endwise sliding movement of beans along said guide ways to project the tips on one end of said beans into the tip receiving means, tip severing means mounted upon said receptacle and operatively associated with one of said tip receiving means to sever the tips of beans projected into said tip receiving means, means for reversing the direction of endwise sliding movement of said beans to direct the tips on the other end thereof toward other of said tip receiving means, other tip severing means mounted upon said receptacle and operatively associated with said other tip receiving means to sever the tips of beans projected thereinto, stationarily mounted means disposed in the operational paths of travel of both of said tip severing means and adapted to co-act therewith for imparting tip severing movement thereto at predetermined tilted positions of the guide ways, and means for discharging the beans from said receptacle.

28. A bean snipper comprising a narrow guide way, means for introducing beans into said guide way for guidance lengthwise thereof, tip receiving means mounted transversely of said guide way adapted to arrest beans sliding along said guide way and to receive the tips of beans therein while retaining the beans, means for tilting said guide way to incline it toward the tip receiving means for sliding the beans endwise along said guide way to project their tips into the tip receiving means, tip severing means supported from said guide way and operatively associated with said tip receiving means to sever the tips of beans projected into said tip receiving means, and stationarily mounted means disposed in the operational path of travel of said tip severing means and adapted to co-act therewith for imparting tip severing movement thereto at a predetermined tilted position of the guide way.

29. A bean snipper comprising a receptacle having a plurality of narrow channeled guide ways, means for introducing beans into said receptacle for guidance lengthwise of said guide ways, tip snipping means operatively mounted upon said receptacle at each end of each of said guideways, each of said tip snipping means being adapted to arrest beans sliding along its correlating guide way and to receive and snip off the tips of beans received therein, means for tilting said receptacle to incline the guide ways toward their correlated tip snipping means at a common end for gravitational endwise sliding action of beans along said guide ways to direct the tips of beans into said tip snipping means, means for thereafter tilting said receptacle for reversed gravitational endwise sliding movement of said beans along said guide ways to direct the unsnipped tips thereof into the other of said tip snipping means at the other common end of said guide ways, stationarily mounted means disposed in the operational paths of travel of said tip snipping means and adapted to co-act therewith for imparting snipping movement thereto at predetermined points in each tilting cycle of said receptacle, and means for discharging the beans from said receptacle.

30. A bean snipper comprising a drum rotatable about an axis, a flat side on said drum substantially parallel to and offset from the drum axis, said flat side being of a width greater than the length of the beans, guide means extending inwardly from said flat drum side to guide said beans for sliding movement endwise transversely across said flat side when the latter is tilted beyond a predetermined angle in the rotation of said drum, tip snipping means operatively carried by said drum and mounted thereon adjacent a longitudinal edge of said flat drum side, said tip snipping means being adapted to arrest beans sliding across said side and to receive and sever the tips on the leading ends of such beans, and stationarily mounted means disposed in the operational path of travel of said tip snipping means and to co-act therewith for imparting snipping movement thereto at a predetermined point in the rotative cycle of said drum when the beans are arrested by the tip snipping means.

31. A bean snipper comprising a drum rotatable about an axis, a bean supporting flat plate disposed on said drum substantially parallel to and offset from the drum axis, said flat plate being of a width greater than the length of the beans, guide means extending inwardly from said flat plate to guide said beans for endwise sliding movement thereacross when said flat plate is tilted beyond a predetermined angle in the rotation of said drum, tip snipping means operatively carried by said drum and mounted thereon to extend lengthwise of said flat plate, said tip snipping means being adapted to arrest said beans and to receive and sever the tips of said arrested beans, and stationarily mounted means disposed in the operational path of travel of said tip snipping means and adapted to co-act therewith for imparting snipping movement thereto at a predetermined point in the rotative cycle of said drum when said beans are arrested by said tip snipping means.

32. A bean snipper comprising a rotary drum, conveyor guide means extending inwardly from the wall of said drum in the nature of a helical thread affording a conveying groove and having a pitch less than the lengths of beans to be snipped therein, a plurality of snipping members disposed lengthwise of said drum and at spaced intervals along said grooves in substantially perpendicular relation to the bottom of the thread-like grooves of said guide means whereby sliding endwise movement of the beans along said thread-like grooves upon rotation of said drum is arrested by each succeeding snipping member, said snipping members being adapted to receive the tip ends of said arrested beans, snipping means carried by said drum and operatively associated with said snipping members and adapted to sever the tips of beans inserted in said members, stationarily mounted means disposed in the operational paths of travel of said tip snipping means and adapted to co-act therewith for imparting snipping movement thereto at predetermined stages in the cycle of rotation of said drum, said snipping members being adapted to retain the beans in arrested position until they are carried beyond a point in the rotation of the drum whereat they topple over in end for end reversed position for slidable movement along the succeeding thread-like groove portion toward the succeeding snipping member in the direction of sliding movement of said beans.

33. In a bean snipper, a helical inwardly open chute comprising successive chute portions angularly offset from each other by an angle sufficient to arrest beans sliding along one of said chute portions toward a next successive chute portion, means for mounting said chute for rotation about its helical axis, the chute portions being of less width and longer than the beans to be snipped, thereby to guide the beans lengthwise therein, snipping means operatively carried by each chute portion and disposed adjacent an angle between successive chute portions to arrest and sever the tips of beans sliding endwise into said angle, and to retain the beans in arrested position until their axes are tilted beyond the vertical by the rotative movement of the chute, thereby to reverse the beans end for end for sliding movement along the next successive portion of the chute when the chute is rotated to position said next successive chute portion at an angle from the horizontal beyond the limiting angle of friction of the beans therein, and stationarily mounted means disposed in the operational paths of travel of said snipping means and adapted to co-act therewith for imparting snipping movement thereto at a predetermined point in the rotative cycle of said helical chute.

References Cited in the file of this patent

UNITED STATES PATENTS

| Number | Name | Date |
|---|---|---|
| 1,054,120 | Horst | Feb. 25, 1913 |
| 1,155,455 | Wegner | Oct. 5, 1915 |
| 1,256,492 | Urschel | Feb. 12, 1918 |
| 1,336,991 | Urschel | Apr. 13, 1920 |
| 1,351,143 | Vandrevil | Aug. 31, 1920 |
| 1,503,612 | Taylor | Aug. 5, 1924 |
| 1,765,952 | Urschel | June 24, 1930 |
| 1,860,746 | MacDougall | May 31, 1932 |
| 2,108,179 | Ryder | Feb. 15, 1938 |
| 2,114,730 | Urschel | Apr. 19, 1938 |
| 2,144,055 | Hall | Jan. 17, 1939 |
| 2,186,084 | Urschel et al. | Jan. 9, 1940 |
| 2,376,062 | Kerr | May 15, 1945 |
| 2,393,461 | Finley | Jan. 22, 1946 |
| 2,540,740 | Kelly | Feb. 6, 1951 |